Figure 1:
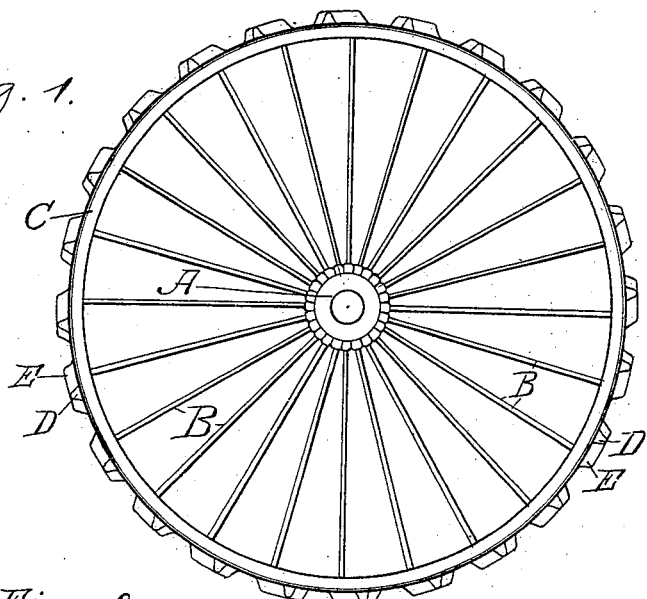

No. 654,049. Patented July 17, 1900.
J. W. BETTENDORF.
METAL RIM FOR WHEELS.
(Application filed Dec. 1, 1899.)

(No Model.)

Witnesses
M. Friel.
F. D. H. Hart.

Inventor;
Joseph W. Bettendorf
By Frank D. Thomason
Atty.

UNITED STATES PATENT OFFICE.

JOSEPH WILLIAM BETTENDORF, OF DAVENPORT, IOWA.

METAL RIM FOR WHEELS.

SPECIFICATION forming part of Letters Patent No. 654,049, dated July 17, 1900.

Application filed December 1, 1899. Serial No. 738,885. (No model.)

*To all whom it may concern:*

Be it known that I, JOSEPH WILLIAM BETTENDORF, a citizen of the United States, and a resident of Davenport, in the county of Scott and State of Iowa, have invented certain new and useful Improvements in Metal Rims for Wheels, of which the following is a full, clear, and exact description, reference being had to the accompanying drawings, and to the letters of reference marked thereon.

My invention relates to the rim of wheels, and particularly to metal and traction-engine wheels requiring a special formation of the tread or periphery thereof to enable it to better obtain a purchase in the roadway. The object of my invention is to simplify and cheapen the construction of the rim of this kind of a wheel, as well as to improve its strength and durability. This I accomplish by making the tread or outer circumference of the wheel of sheet metal and stamping the same so as to give it the requisite formation, substantially as hereinafter fully described and as is illustrated in the drawings, in which—

Figure 2:
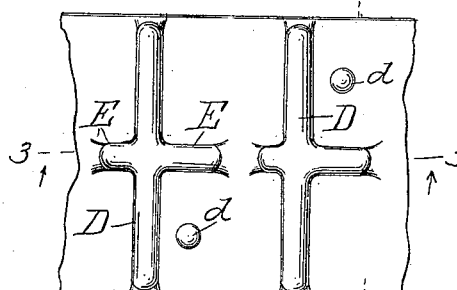
Figure 3:
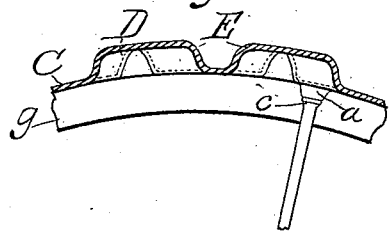
Figure 4:
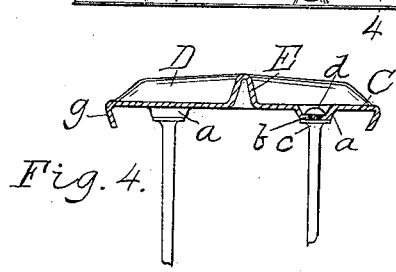
Figure 5:
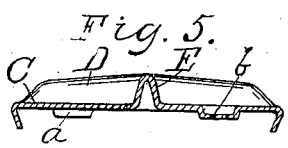

Figure 1 is a side view of a wheel provided with my improved rim. Fig. 2 is a plan view of a portion of the said rim on an enlarged scale. Fig. 3 is a longitudinal section of the same, taken on dotted line 3 3, Fig. 2. Fig. 4 is a transverse section thereof, taken on dotted line 4 4, Fig. 2, showing the outer ends of the spokes secured therein; and Fig. 5 is a view similar in all particulars to Fig. 4, but with the spokes removed.

In the drawings, A represents the hub of the wheel, B the spokes, and C the rim thereof. It is immaterial so far as my invention is concerned how the spokes are secured to the hub; but it is desirable to countersink from the tread inward the openings $a$ in the rim, through which their outer ends pass and in which they are secured.

As shown in the drawings, the periphery or tread of the rim C is flat, excepting as will hereinafter more fully appear, and in order to make the countersunk openings $a$ therein of such shape as to be suitable for my purposes the margins of these openings are each provided with an annular seat $b$. The spokes B are near their outer ends provided with a circumferential flange $c$, the side of which next the end of the spoke is flat, so as to make a shoulder that will bear flat against the inner marginal surface of said opening when the end of the spoke extending through the same is swaged into a head $d$, as shown. The head $d$ of the spoke does not preferably project beyond the plane of the tread and is thus protected from the wear and strain it might otherwise experience by contact with and abrasion of the road.

In order to enable the rim to obtain a purchase on the soil over which it travels, I have provided it with a series of cross-shaped ridges, which consist of transverse ridges D, that are located an equal distance apart and are intersected at about their centers of length by longitudinal ridges E. These longitudinal ridges E extend, preferably, slightly longer in one direction from said transverse ridges than in the other, but not sufficient to bring them in touch with the next cross-ridge immediately preceding or following the same. The important feature of these ridges is that they are stamped out by forcing the metal outward with suitable dies, and consequently they are homogeneous with the sheet metal of which the rim is made. These ridges cannot become loose or detached from the tread of the rim, as is possible by the present construction, because, so far as I am aware, it is the general custom to cast said ridges to a plate which is then riveted to the rim proper. My invention avoids the expense of the labor necessary to rivet or otherwise secure ridge-plates on the rim.

My invention does not make it necessary for me to confine myself to the particular cross-ridge shown, as it is obvious other designs may be adopted. I prefer to use the cross-ridge design shown, though, because the longitudinal ridges by cutting into the coil spread the same, so that it packs as the transverse ridge enters and pushes into the same. I much prefer to use the countersunk openings for the outer ends of the spokes; but these might be dispensed with, however.

In order to prevent the soil from falling upon the inner circumference of the rim when the weight causes the rim to sink into the same and also in order to strengthen the rim, I prefer to make the side edges thereof with flanges $g\ g$, that project in toward the axes of the wheel. These flanges, while desirable, may be dispensed with.

What I claim as new is—

1. A sheet-metal rim for wheels having ridges projecting from its tread or periphery that are stamped out of the same and are made homogeneous therewith, and which is provided with a series of stamped countersunk spoke-openings, each of which has an annular marginal seat around it, in combination with metal spokes which are provided with circumferential flanges near their outer ends that bear against the inner edges of said spoke-openings, and heads that are seated on said annular marginal seats, as set forth.

2. A sheet-metal rim for wheels, having a series of transverse ridges and a series of intersecting longitudinal ridges projecting from its tread or periphery that are stamped out of the same and are made homogeneous therewith, which has its side edges flanged inward the axis of the wheel and is provided with a series of stamped countersunk spoke-openings, each of which has an annular marginal seat around it, in combination with metal spokes which are provided with circumferential flanges near their outer ends that bear against the inner edges of said spoke-openings and heads that are seated on said annular marginal seats, as set forth.

JOSEPH WILLIAM BETTENDORF.

Witnesses:
W. H. FORREST,
HENRY BELLINGHAUSEN.